United States Patent [19]

Draffone

[11] 4,050,975

[45] Sept. 27, 1977

[54] O-RING SPLICING FIXTURE

[75] Inventor: A. Peter Draffone, Lombard, Ill.

[73] Assignee: B.W. Darrah, Inc., Chicago, Ill.

[21] Appl. No.: 725,419

[22] Filed: Sept. 22, 1976

[51] Int. Cl.² .................................................. B29C 19/00
[52] U.S. Cl. ........................................ 156/217; 83/176; 156/304; 269/295
[58] Field of Search ............. 83/176, 450, 608, 699, 83/177, 1 SP, 1 F; 269/305, 47, 48, 291, 295; 277/216, 220; 156/158, 159, 217–218, 304

[56] References Cited

U.S. PATENT DOCUMENTS

| 503,341 | 8/1893 | Briggs | 83/176 |
|---|---|---|---|
| 1,450,346 | 4/1923 | Anderson | 277/216 X |
| 1,540,362 | 6/1925 | Norvell | 83/176 X |
| 1,770,056 | 7/1930 | Woods | 83/176 |
| 2,263,231 | 11/1941 | Zimmerman | 83/176 |
| 2,580,772 | 1/1952 | Hawkins | 269/48 |
| 2,926,906 | 3/1960 | Hawkins | 83/456 X |
| 3,683,557 | 8/1972 | Maples | 83/176 |

Primary Examiner—David A. Simmons
Attorney, Agent, or Firm—Alter and Weiss

[57] ABSTRACT

A fixture for use in preparing replacement O-rings from cord material, such as buna-N. The fixture automatically provides mating ends which when spliced together preclude undue stress along the plane of splicing.

10 Claims, 5 Drawing Figures

O-RING SPLICING FIXTURE

This invention relates to splicing fixtures, and more particularly, to splicing fixtures used in preparing replacement O-rings from cord stock.

It is known to replace faulty O-rings with new O-rings fabricated on the job from cord stock. This is presently accomplished by maintenance personnel. The maintenance man measures the diameter of the O-ring material and the diameter of the O-ring. He then measures a piece of cord stock of the proper diameter so that when the ends of that piece of cord stock are glued or vulcanized together, an O-ring having the proper diameter for sealing is obtained for use as a replacement O-ring.

One of the problems presently encountered in fabricating replacement O-rings is that the ends of the O-ring to be spliced together are planar, and the plane is perpendicular to the longitudinal axis of the cord material; whereas, when the ends are spliced together to complete the O-ring, the longitudinal flexible cord is forced into a curved configuration so that the ends are on a plane that is not perpendicular to the longitudinal axis. Forcing the longitudinal cord into this curved configuration causes stresses at the joined ends. These stresses tend to appreciably shorten the life of the replacement O-rings. Ideally, the final O-ring forms a perfect circle and should have a uniform cross-sectional stress throughout the entire circumference of the part.

Another problem with the presently used methods and apparatus for fabricating replacement O-rings is that during the vulcanizing or gluing process used in splicing the ends together, the ends of the flexible cord material are hand held in the curved configuration of the final O-ring.

Accordingly, it is an object of the present invention to provide new and improved O-ring splicing fixtures.

It is a more particular object of the present invention to provide O-ring splicing fixtures for use in fabricating replacement O-rings from cord material. The fixtures retain the material in desired curved configurations so that radial cuts can be made while the material is flexed in the arcuate shapes the material will have when the O-ring is finished; whereby both ends of the O-rings are cut along the same diametral plane.

A related object of the present invention is to provide O-ring splicing fixtures enabling raw flexible linear material to be cut so that the cut ends can be joined to form a perfect circle with uniform cross sectional stress.

Yet another object of the present invention is to provide O-ring splicing fixtures that facilitate splicing of the O-ring cord material whether the O-ring is being fabricated into an outer diameter or an inner diameter replacement O-ring.

Another object of the present invention is to provide O-ring splicing fixtures that are amenable to almost all sizes of cord material used in replacement O-ring fabrication.

Still another object of the present invention is to provide O-ring splicing fixtures having integral means for attaching cutting blades to the fixture.

In a preferred embodiment of the present invention an O-ring splicing fixture is provided having a plurality of parallel archimedian spiral sections. The parallel spiral sections are defined by three spiral walls extending upward from a horizontal surface. The walls are slotted to receive cutting blades along a series of diametral planes. The cord material, such as buna-N, for example, is placed in either one of the two spirals depending on whether the O-ring is to replace inner diameter or an outer diameter O-rings. The slots are marked on a metric scale to indicate where the arcuate shape is for the diameter of the O-ring desired.

The cord having previously been cut to size is trimmed at both ends at the slot by placing a cutting edge, such as a single edge razor blade, in the appropriately marked slot to trim the ends thereat. Thus, if an O-ring of 70 mm diameter is required, the cutting blade is placed in the slot marked 70 for trimming the ends of the cord material at that point. Because of the shape of the spiral walls, the angle at which the cord is cut conforms to the diametral plane of the final O-ring at the point of joinder of the ends. This is in contrast to previous fixtures wherein the cord was cut on a plane normal to the longitudinal axis thereof.

The above mentioned and other features of this invention will be best understood by making reference to the following drawings in which.

Figure 1:
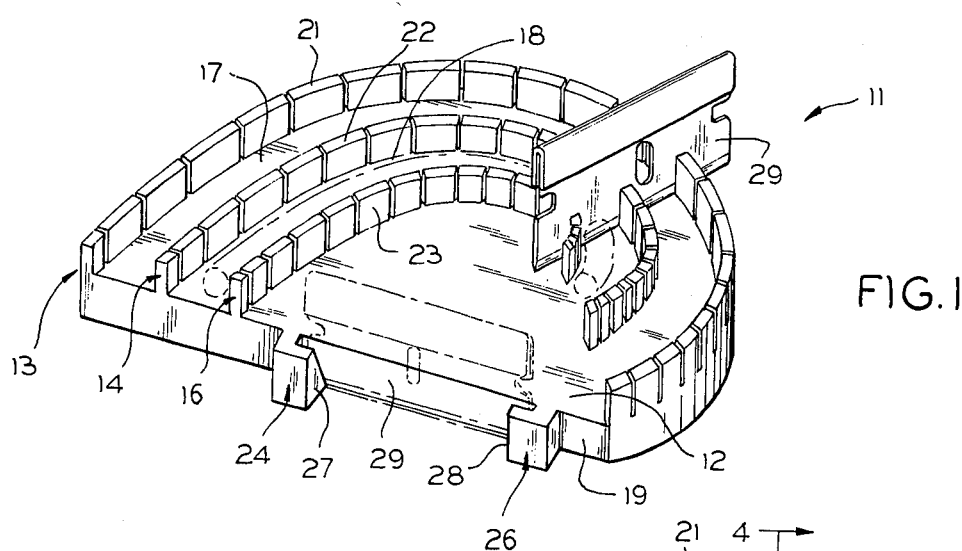
FIG. 1 is a pictorial view of the fixture showing the cutting tool in position in the fixture.

The O-ring splicing fixture is pictorially shown in FIG. 1 and generally indicated as 11. It includes a flat horizontal surface 12 whose outer periphery is described by a slotted vertical wall generally shown as 13. The slotted vertical wall is in the form of an archimedian spiral where the radius of curvature is directly proportional to the number of radians that the point tracing the curve has traveled from the origin.

Means are provided for receiving the flexible cord material and forming it into the desired arcuate posture prior to cutting and trimming the ends in preparation for joining the ends together. Parallel to slotted vertical wall 13 are intermediary vertical wall 14 and inner vertical wall 16. The walls 13, 14 and 16 form O-ring cord material receiving grooves 17 and 18. Groove 17 is utilized when an O-ring is desired which fits around an outer diameter. Groove 18 is used when an O-ring is desired for fitting around an inner diameter.

The outer vertical wall 13 begins and ends at a front vertical face 19. At one end, each of the vertical walls 14 and 16 start at the face 19 and extend parallel to wall 13. At the other end walls 14 and 16 are spaced apart from the face 19 varying amounts. Thus, the inner wall 16 is spaced apart from face 19 a larger distance than the other end of vertical wall 14, forming a diametral plane. Each vertical wall 13, 14 and 16 includes 24 slots, such as slots 21, 22 and 23, respectively.

In a preferred embodiment of the invention, the segments of the wall as defined by the slots start in two milimeter increments from a point defining the curve of an O-ring circle circumference of 26 mm through 40 mm. From 40 – 120 mm the segments are divided in five milimeter increments. The slot width is in the order of 0.5 mm. The walls themselves have a thickness of approximately 3.175 mm.

Figure 2:
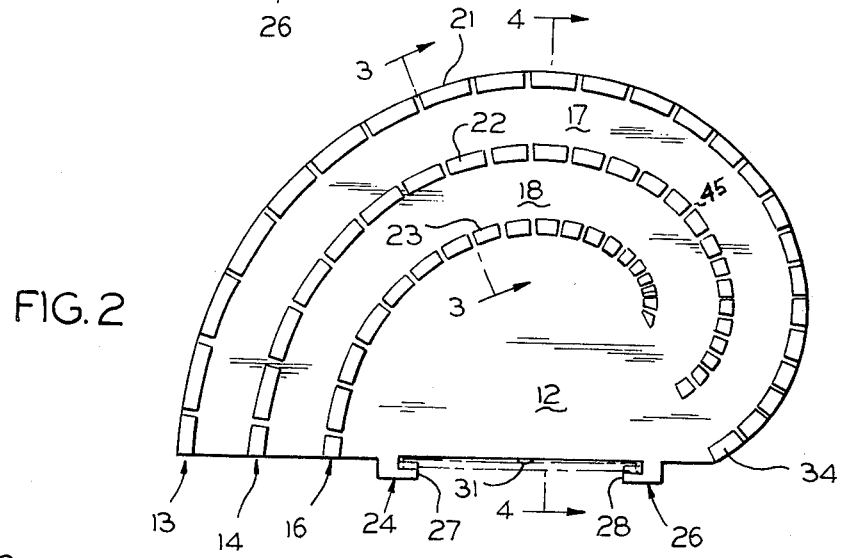
FIG. 2 is a plan view of the fixture of FIG. 1.

Extending outwardly from front face 19 are integral blade holding L-shaped members 24 and 26. The base of the L-shaped members 27 and 28, respectively have truncated pyramid-like shapes so that there is less room from front face 19 to the base section at the bottom of face 19 than there is at the top of face 19. This ensures securely holding the cutting blade in the distance between the base and the front face. A nipple 31, best seen in FIG. 2, assures that the blade is held firmly against the base portions of the L-shaped members.

The cutting blade 29 is shown in FIG. 1 positioned for cutting the cord material used in fabricating the replacement O-ring. Each of the slots is numbered to correspond to the circumference of the O-ring being fabricated. Thus, for example, when trimming the ends of an O-ring having a diameter of 45 mm, the blade is set at the slot numbered 45.

Figure 3:
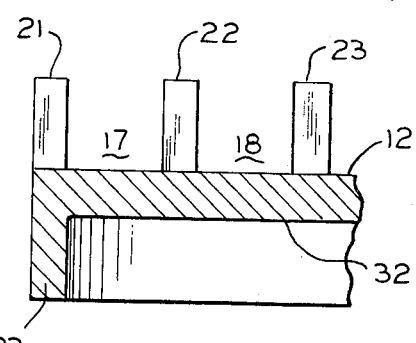
FIG. 3 is a partial sectional view of the fixture taken along plane 3—3 and looking in the direction of the arrows.

In FIG. 3 a view of the slots 17 and 18 is shown as defined by segments 21, 22 and 23. Therein it is also seen that there is an unslotted wall 33 defining the outer periphery of the bottom 32 of horizontal surface 12. The wall is used for support when joining together, either by gluing or vulcanizing the ends of the cord, while fabricating the O-ring. The shape of the wall 33 follows the shape of the wall 13 and thus provides different curvatures which are helpful in holding the ends of the O-ring together during the gluing process.

Figure 4:
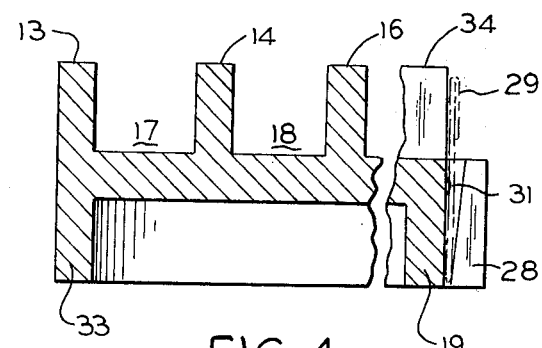
FIG. 4 is a partial plan view of the fixture taken along plane 4—4 and looking in the direction of the arrows.

FIG. 4 also shows the grooves 17 and 18 defined by segments of walls 13 and 14 and 16. In a preferred embodiment as referred to hereinabove, the grooves 17 and 18 are each 14.288 mm. The segment 34 at the end of wall 13 is also visible in this view. In addition base section 28 of the L-shaped element 26 is also visible showing the varying distance between section 28 and front surface 19. The blade 29 is shown trapped between section 28 and nipple 31.

Figure 5:
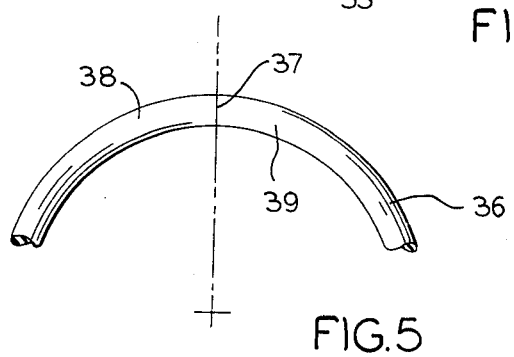
FIG. 5 is a pictorial view of a section of a replacement O-ring.

FIG. 5 shows a portion of a fabricated O-ring 36 having a point of splicing of the ends thereof on a perfect diametral plane 37. Prior to the use of the fixture the ends 38 and 39 of the O-ring would not be joined together on a diametral plane. The inner portion at the joined ends would be under pressure while the outer portion at the joined ends would be under tension. The unequal stresses are caused by the fact that the outer circumference of the O-ring is slightly longer than the original length of the cord material from which the O-ring is fabricated. Similarly, the inner circumference is slightly shorter than the original length of the cord material.

The fixture is preferrably constructed by first selecting a center for the center wall spiral. The radius of the smallest O-ring sized circle to be fabricated using this splicing fixture is first used. In the preferred embodiment previously referred to an O-ring of 26 mm is the smallest. Therefore, an arc of 10° using a radius of 13 mm was struck. A line extending from the end of the arc back to the center was drawn. Since segments of 2 mm increments were used, the next segment was for defining an O-ring with a 28 mm radius. Therefore, the next center was determined by measuring back on the newly constructed line a distance of 14 mm.

Another arc of 10° was drawn from that center point. From the end of the arc a line was drawn back to the new center point and a third center point was determined by measuring from the arc a distance of 15 mm. This was continued for the entire length of the intermediary wall.

The outer and inner walls were then defined by measuring fixed distances from the intermediary wall. In that manner an approximate archimedian spiral was generated which serves to define the grooves.

In practice the flexible cord material is placed in the grooves and the cutting blade is placed in the slots defining the diametral plane desired. The ends of the cord are trimmed with the cutting blade in that groove and the cord material held in the desired arcuate position.

While the principles of the invention have been described above in connection with specific apparatus and applications of the invention, it should be understood that this description is made by way of example only and not as a limitation on the scope of the invention.

I claim:

1. An O-ring splicing fixture for use in preparing replacement O-rings from flexible cord material,
said fixture comprising:
a base unit having a horizontal plane surface;
spiral means on said plane surface for use in conforming said cord material to said spiral shape;
slicing means on said spiral means to enable slicing said cord material at selected points along said spiral;
said slicing means located on said spiral to define a diametral plane for trimming the ends of the O-ring cord material such that when the ends are joined together the O-ring will form a perfect circle with uniform cross-sectional stress through the entire circumference of the O-ring.

2. The O-ring splicing fixture of claim 1 wherein said spiral means comprises a plurality of spiral walls spaced apart from each other to form grooves therebetween, and
said walls extending vertically upward from said horizontal plane surface, whereby said grooves receive and conform the flexible cord material to the spiral shape.

3. The O-ring splicing fixture of claim 2 wherein said slicing enabling means comprises a plurality of slots in said walls.

4. The O-ring splicing fixture of claim 3 wherein said slots are normal to said plane surface.

5. The O-ring splicing fixture of claim 4 wherein the slots in said plurality of walls are aligned whereby a cutting blade received in said aligned slots is on a desired diametral plane.

6. The O-ring splicing fixture of claim 5 wherein means are provided on said base unit of said fixture for storing said cutting blade.

7. The O-ring splicing fixture of claim 6 wherein said base unit comprises a front face normal to and extending downward from said horizontal plane surface, and
wherein said means for storing said cutting blade comprises a pair of spaced apart L sections integral to said front face, and
the base of said L sections being spaced apart from said front face to enable receiving said cutting blade between the base of said L sections and said front face.

8. The O-ring splicing fixture of claim 7 and means on said front face for assuring that said cutting blade is securely held by said pair of L sections.

9. The O-ring splicing fixture of claim 5 wherein said spiral defined by said plurality of walls is an archimedian spiral, said plurality of walls consists of three walls -- an exterior wall, an intermediate wall and an inner wall, said exterior wall extending downward below said horizontal plane surface to form cord bonding means having a varied arcuate surface for use in bonding O-rings of different diameters.

10. The method of fabricating O-rings from flexible cord material comprising steps of:

cutting the desired cord material to a length slightly larger than the circumference of the O-ring required;

forming a spiral of the cut cord material;

keeping the spiral formed cut cord material in a single plane thereby conforming the cord material at the ends to the arcuate shape determined by the desired finished O-ring;

cutting the spiral formed cord material along the diametral plane at a point on the spiral where its arcuate shape conforms to the arcuate shape determined by the desired finished O-ring to form one end;

repositioning the cut cord materials into the spiral with the other end at the point in the spiral so that its arcuate shape conforms to the shape of the finished O-ring;

trimming the other end along the diametral plane at the same point on the spiral; and bonding the one end and the other end together to complete the O-ring forming a perfect circle with uniform cross-sectional stress.

* * * * *